(12) United States Patent
Dave

(10) Patent No.: US 6,550,042 B1
(45) Date of Patent: Apr. 15, 2003

(54) HARDWARE/SOFTWARE CO-SYNTHESIS OF HETEROGENEOUS LOW-POWER AND FAULT-TOLERANT SYSTEMS-ON-A CHIP

(75) Inventor: Bharat P. Dave, Howell, NJ (US)

(73) Assignee: Agere Systems Inc., Allentown, PA (US)

( * ) Notice: Subject to any disclaimer, the term of this patent is extended or adjusted under 35 U.S.C. 154(b) by 182 days.

(21) Appl. No.: 09/659,090

(22) Filed: Sep. 11, 2000

Related U.S. Application Data

(60) Provisional application No. 60/153,883, filed on Sep. 14, 1999.

(51) Int. Cl.⁷ .................................................. G06F 9/45
(52) U.S. Cl. ..................... 716/5; 716/1; 716/3; 716/7; 716/17; 716/18
(58) Field of Search ............................... 716/5, 1, 3, 7, 716/17, 18

(56) References Cited

U.S. PATENT DOCUMENTS

| | | | | | |
|---|---|---|---|---|---|
| 6,110,220 A | * | 8/2000 | Dave et al. | ................. | 709/102 |
| 6,112,023 A | * | 8/2000 | Dave et al. | ................... | 703/27 |
| 6,152,612 A | * | 11/2000 | Liao et al. | ..................... | 703/15 |
| 6,289,488 B1 | * | 9/2001 | Dave et al. | ................. | 709/102 |

OTHER PUBLICATIONS

M. Hunt et al, "Blocking in a system on a chip", IEEE Spectrum, Nov. 1996.*
E. Filippi et al,"Intellectual property re–use in embedded system co–design: an industrial case study", IEEE System Synthesis Proceedings, Dec. 1998.*
E. Filippi et al,"The virtual chip set: a parametric IP library for system–on–a–chip design",Custom Integrated Circuits Conference Proceedings, May 1998.*

* cited by examiner

*Primary Examiner*—Vuthe Siek
*Assistant Examiner*—Brandon Bowers
(74) *Attorney, Agent, or Firm*—Steve Mendelsohn

(57) ABSTRACT

The present co-synthesis technique takes as an input embedded system specification in terms of acyclic task graphs, system constraints, and a resource library consisting of several functional blocks such as processor cores, memory, proprietary and non-proprietary functional blocks, and generates a low-cost hardware and software architecture for systems-on-a-chip such that all real time constraints are met while minimizing average power dissipation. It employs a floor-planning based delay estimator during evaluation of various architectures. Actual delay measurements made on synthesized chips indicate that the delay estimator error is less than 12%. The technique can be extended to derive fault-tolerant architectures for systems-on-a-chip employed in critical applications. Fault-detection capability is imparted to the system by adding assertion and duplicate-and-compare tasks to the task graph specification prior to co-synthesis. Error recovery is achieved by switching to spare functional blocks. The reliability and availability of the architecture are evaluated during co-synthesis using Markov models. Application of the technique to examples from real-life systems such a cellular hand sets, video set-top boxes, frame relay interfaces, and Asynchronous Transfer Mode (ATM) switch controllers shows its efficacy. The technique is able to achieve up to 90% cost reduction by employing a systems-on-a-chip concept when compared to architectures employing discrete devices. The technique optimizes both power and fault-tolerance overhead.

14 Claims, 5 Drawing Sheets

FIG. 2A

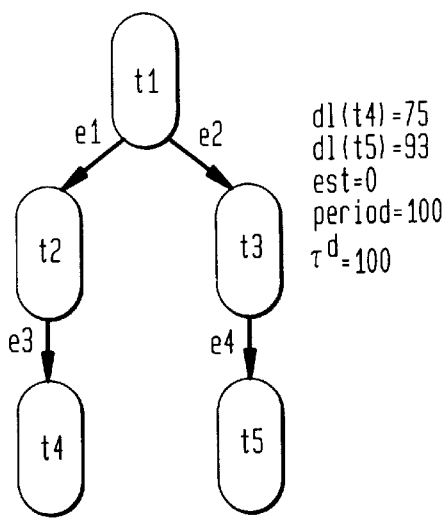

dl(t4)=75
dl(t5)=93
est=0
period=100
$\tau^d$=100

FIG. 2B

PE library: [Core1, Core2, Macro1, Macro2]
Link library:[Link1, Bus1]

FIG. 2C execution_vector(t1) = [22, 10, x, x]
execution_vector(t2) = [27, 15, x, x]
execution_vector(t3) = [20, 11, x, x]
execution_vector(t4) = [36, 21, x, x]
execution_vector(t5) = [39, 22, x, x]
execution_vector(t3c) = [x, x, 7, 4]
execution_vector(t4c) = [x, x, 8, 5]
execution_vector(t5c) = [x, x, 10, 5]

x = not applicable, i.e. non-preference communication_vector(e1)=[20, 15]
communication_vector(e2)=[22, 15]
communication_vector(e3)=[22, 15]
communication_vector(e4)=[8, 5]
communication_vector(e5)=[15, 10]
communication_vector(e6)=[8, 5]
communication_vector(e7)=[15, 10]

FIG. 2D

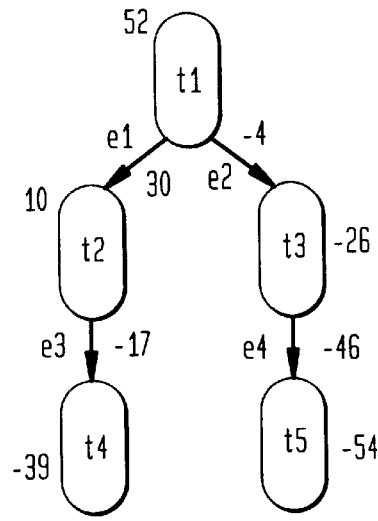

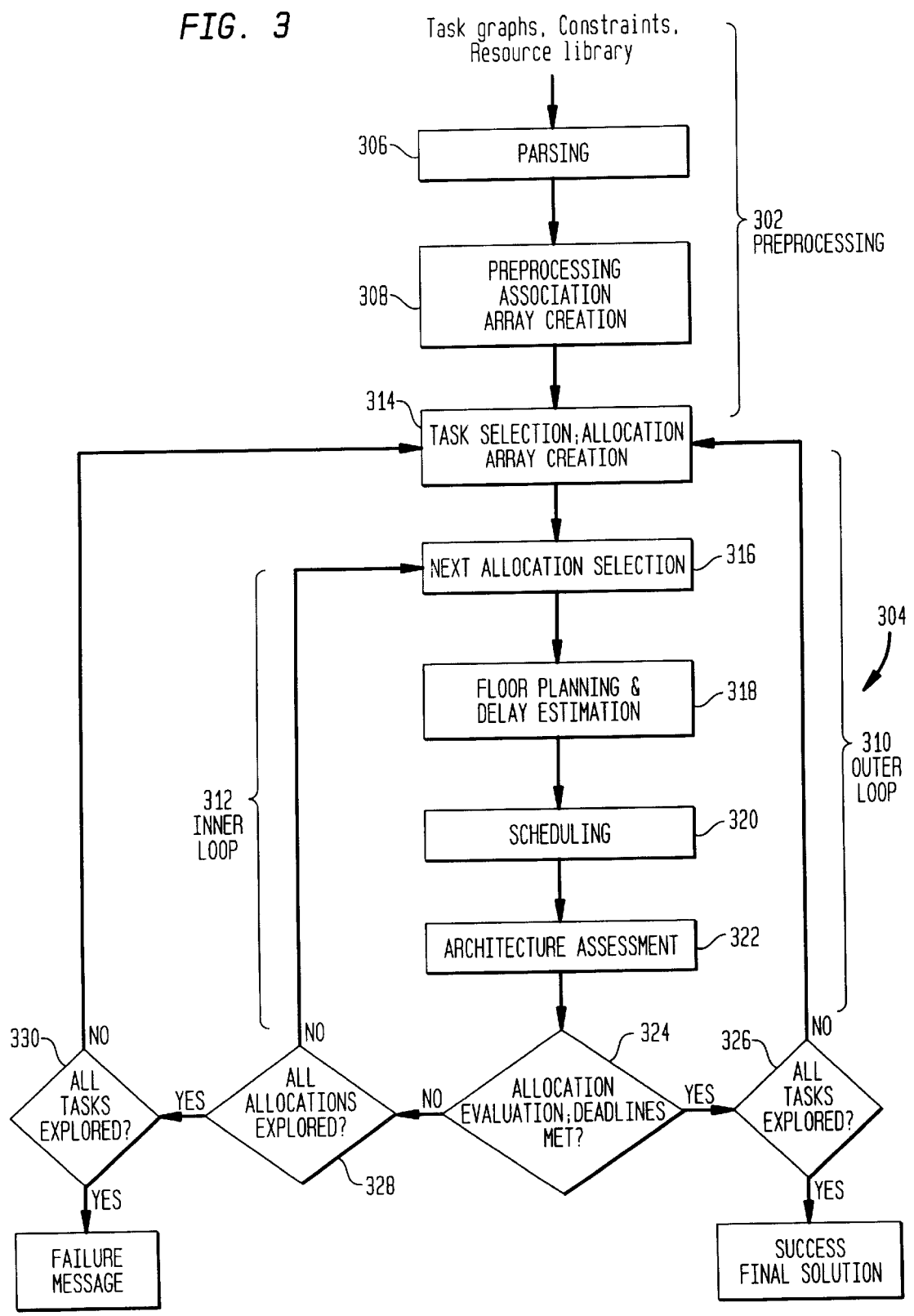

FIG. 4

```
1   FLOOR_PLAN_&_DELAY_ESTIMATE(architecture,
2   layout_hint_list, task graphs){
3   mark each PE and link of the architecture unselected;
4   FP = floor_plan = NULL;//initialize floor plan;
5   compute CI_j = connectivity index for each PE_j;
6   //connectivity index = number of nets to/from PE
7   PE_array = order PE on the order of decreasing CI;
8   if(layout_hint_list!=NULL){
9     for each hint h_k in hint_list{
10    //each h_k represents a floor plan F_k for group of PEs and links
11    Add F_k to FP and mark associated PEs and link selected;}}
12  COMPLETE_FLOOR_PLAN(FP,architecture){
13    for each unselected PE l in the PE_array{
14      mark PE l selected;
15      FP←Place PE l next to its maximally compatible PE m
16      //PE l has highest number of nets to/from PE m
17      of connections}}
18  UPDATE_NET_DELAY{
19    for each net e_p in FP{
20    e_p_delay ← modify delay considering floor plan}}
21  return task graphs with updated delay;
22  }
```

FIG. 5A

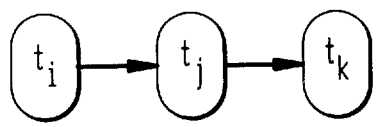

FIG. 5B

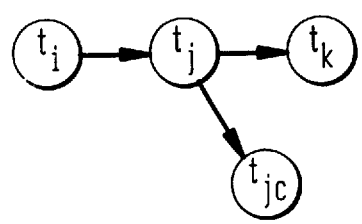

FIG. 5C

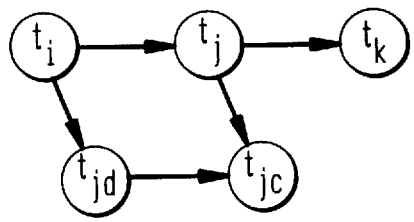

FIG. 6

| Example/ # of tasks | Non SOC architectures | | SYNSOC without power optimization | | | | | | SYNSOC for low-power architectures | | | | | | SYNSOC for fault tolerant architectures | | | | | |
|---|---|---|---|---|---|---|---|---|---|---|---|---|---|---|---|---|---|---|---|---|
| | Cost ($) | Avg. Power (W) | Package pins | No. of cores | Cost ($) | Avg. Power (W) | CPU time (sec) | Cost Savings over non-SOC architectures (%) | Package pins | No. of cores | Cost ($) | Avg. Power (W) | CPU time (sec) | Power Savings (W) % | Package pins | No. of cores | Cost ($) | Avg. Power (W) | CPU time (sec) | Savings over DMR (%) |
| CDHST/168 | 335 | 4.6 | 225 | 1 | 35 | 1.3 | 975 | 90 | 225 | 1 | 40 | 1.1 | 984 | 15.3 | 225 | 2 | 54 | 1.7 | 1186 | 22.8 |
| VDSTP/214 | 260 | 5.2 | 225 | 1 | 30 | 1.0 | 1014 | 88 | 225 | 1 | 35 | 0.9 | 1228 | 10.0 | 225 | 2 | 48 | 1.4 | 1334 | 20.0 |
| FRLYIN/316 | 410 | 8.1 | 357 | 2 | 68 | 2.3 | 1810 | 83 | 357 | 2 | 86 | 1.9 | 1946 | 17.3 | 357 | 3 | 105 | 2.8 | 2148 | 22.4 |
| ACSINF/486 | 640 | 9.2 | 357 | 2 | 90 | 2.8 | 2018 | 86 | 357 | 2 | 105 | 2.4 | 2234 | 14.3 | 357 | 3 | 122 | 3.4 | 2433 | 32.2 |

HARDWARE/SOFTWARE CO-SYNTHESIS OF HETEROGENEOUS LOW-POWER AND FAULT-TOLERANT SYSTEMS-ON-A CHIP

CROSS-REFERENCES TO RELATED APPLICATIONS

This application claims the benefit of the filing date of U.S. provisional application No. 60/153,883, filed on Sep. 14, 1999. The subject matter of this application is related to the subject matter of U.S. patent application Ser. No. 09/024,604 filed on Feb. 17, 1998, Ser. No. 09/024,605 filed on Feb. 17, 1998, Ser. No. 09/025,537 filed on Feb. 17, 1998, Ser. No. 09/024,839 filed on Feb. 17, 1998, Ser. No. 09/025,097 filed on Feb. 17, 1998, Ser. No. 09/024,762 filed on Feb. 17, 1998, Ser. No. 09/025,017 filed on Feb. 17, 1998, Ser. No. 09/024,846 filed on Feb. 17, 1998, Ser. No. 09/393,535 filed on Sep. 10, 1999, the teachings of all of which are incorporated herein by reference.

BACKGROUND OF THE INVENTION

1. Field of the Invention

The present invention relates to the design of real-time distributed embedded systems, and, in particular, to the process of partitioning an embedded system specification into hardware and software modules using hardware-software co-synthesis.

2. Description of the Related Art

Systems-on-a-chip (SOC) based embedded systems are crucial for satisfying ever increasing demand for high-performance, low-cost, and low-power applications commonly found in portable and multimedia systems. See References (1)–(3). With advancements in semiconductor technology, it is not possible to achieve a high degree of functional integration on a single chip. System bandwidth has become a critical performance bottleneck for emerging multimedia applications based on high-performance video and audio. Also, significantly higher speed can be achieved with an on-chip bus between an I/O (input/output) system and a processor. Functional integration is motivated by higher speed as well as reduced communication delays between processors and I/O systems. The architectures embedded systems is generally defined based on the experience of system architects, and, at times, it is either over-designed or fails to meet the requirements. Finding an optimal hardware-software architecture entails selection of processors, application-specific functional units, and communication links such that the cost of the architecture is minimum and all real-time constraints are met. Hardware-software co-synthesis involves various steps such as allocation, scheduling, and performance estimation. Both allocation and scheduling are known to be NP-complete. See Reference (4). Therefore, optimal co-synthesis is computationally a hard problem. See Reference (5). In addition, since many embedded systems are used in mobile applications, both peak and average power consumption have become important concerns. The peak power consumption determines the packaging cost and the average power consumption determines the battery life. Thus, it is also important to optimize power consumption during co-synthesis.

Distributed embedded system architectures employ multiple CPUs, ASICS, and field-programmable gate arrays (FPGAs). In the case of a systems-on-a-chip approach, all of these function blocks are integrated on a single chip. The prior art has mostly focused on hardware-software co-synthesis of distributed embedded systems. See References (5)–(14). Two distinct approaches have be used for distributed system co-synthesis: optimal and heuristic. In the optimal domain, the two approaches are mixed integer linear programming (MILP) (see Reference (8)) and exhaustive (see Reference (9)). Optimal approaches are suitable only for small task graphs. There are two distinct approaches in the heuristic domain: iterative (see References (5), (10), and (14)) and constructive (see References (11) and (12)). None of the above approaches are suitable for synthesis of systems-on-a-chip for the following reasons. First of all, the performance estimation technique used in distributed system co-synthesis can no longer assume that the communication time within Processing Elements (PEs) take much less time than inter-PE communication. Moreover, a more accurate method of estimating the interconnect delay is needed.

SUMMARY OF THE INVENTION

The present invention is related to a heuristic-based co-synthesis technique, called SYNSOC (SYNthesis of Systems-On-a-Chip), which includes allocation, scheduling, and performance estimation steps as well as power optimization features. It performs floor-planning of the chip to accurately estimate the inter-connect delay, which is very important for evaluation of architecture performance for systems-on-a-chip. It automatically synthesizes the processor bus size as well as determines the clock speed for the I/O and processor bus. The present technique is suited for synthesis of both small- and large-scale real-time systems-on-a-chip. Critical applications of SOCs require high reliability and availability. Therefore, it is very important that fault tolerance needs are addressed by the co-synthesis algorithm. Systems are made fault tolerant by adding fault detection followed by error recovery. See References (12), (15), (16), and (17). Application of the present technique to several examples from the real-life systems shows its efficacy.

In one embodiment, the present invention is a computer-implemented method for designing an architecture of an embedded system-on-a-chip (SOC), comprising (a) a pre-processing phase comprising the step of parsing one or more task graphs, one or more system/task constraints, and a resource library for the embedded SOC; and (b) a synthesis phase, following the pre-processing phase, comprising the step of allocating one or more groups of one or more tasks in the task graphs to one or more processing elements (PEs) in the resource library and allocating one or more edges in the task graphs to one or more communication links in the resource library, based on performance evaluation of one or more possible allocations for each of the groups and edges in light of the system/task constraints, to generate a current version of the embedded SOC, wherein, prior to the performance evaluation for a current allocation, floor-planning is performed to update a delay estimate for each of one or more of the allocated edges in the current version of the embedded SOC.

BRIEF DESCRIPTION OF THE DRAWINGS

Other aspects, features, and advantages of the present invention will become more fully apparent from the following detailed description, the appended claims, and the accompanying drawings in which

FIGS. 2(a)–(d) show a task graph and its attributes;

FIG. 3 shows the co-synthesis process flow for the SYNSOC system, according to one embodiment of the present invention;

FIG. 4 shows pseudocode for the floor-planning and delay estimation procedure of FIG. 3;

FIGS. 5(a)–(c) show task graphs that illustrate fault-detection latency; and

FIG. 6 presents Table 2, which shows experimental results.

DETAILED DESCRIPTION

Preliminaries

Figure 1:
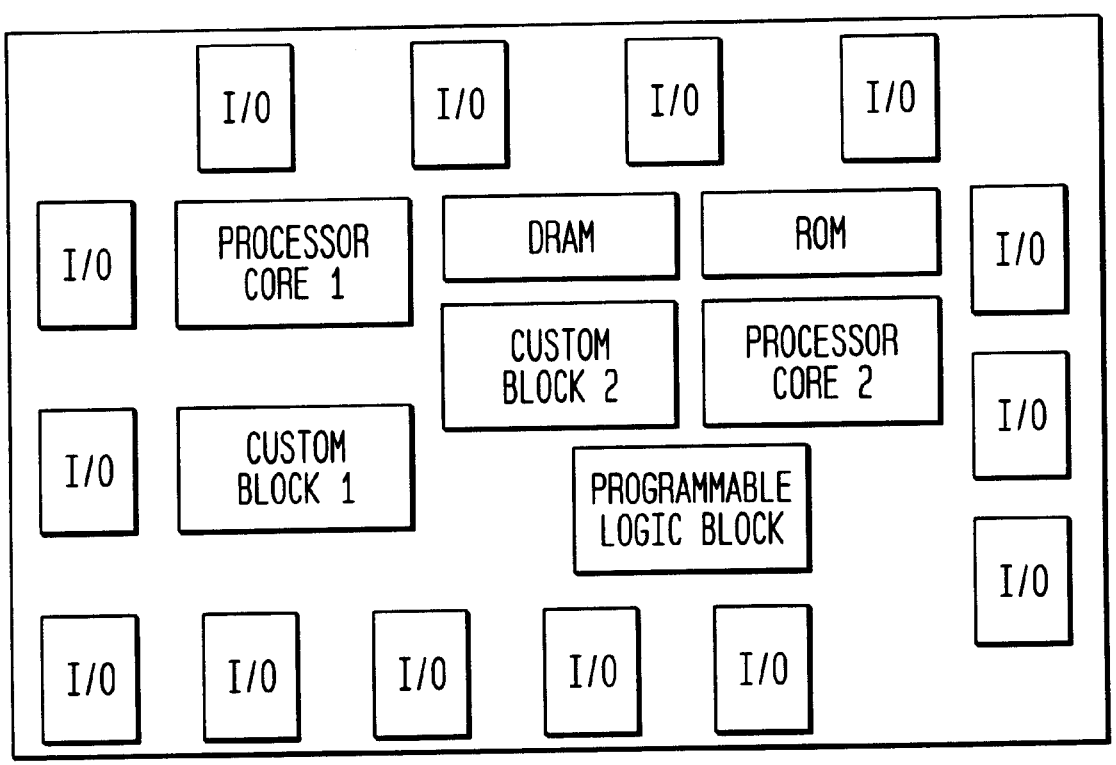
FIG. 1 shows a block diagram of a typical system-on-a-chip.

Typical embedded systems-on-a-chip, such as that shown in FIG. 1, comprise one or more off-the-shelf general processor cores, RAMs, ROMs, programmable logic blocks, functional macros based on standard cells, analog buffers, etc. The hardware architecture of a SOC defines the type and interconnection of various hardware modules, and the interfaces between them. Its software architecture defines the allocation of sequences of code to specific general-purpose processor cores. The SYNSOC technique of the present invention does not use a predefined architecture template since such a template may lead to inefficient architectures. See Reference (13). SYNSOC automatically synthesizes the architecture of the SOC. The embedded system functionality is usually described through a set of acyclic task graphs, whose nodes represent tasks. Tasks communicate data to each other, indicated by a directed edge between two communicating tasks. For periodic task graphs, each graph has an earliest start time (est), a period, and a deadline, as shown for an example in FIG. 2(a). Each task of a periodic task graph inherits the graph's period and can have a different deadline.

Embedded system specifications are mapped to elements of a resource library which comprises a PE (processing element) library and link library. The PE library comprises various functional macros such as processor cores, memory blocks, programmable functional units, and proprietary and non-proprietary functional blocks. PE and link libraries that require multiple supply voltages are supported. The PE and link libraries together form the resource library. A sample library is shown in FIG. 2(b). Each element of the PE library is characterized by supply voltage, area, netlist, post layout delay information, average and peak power dissipation, inputs, outputs, drive capability for each buffer, etc. Similarly, each link is characterized by supply voltage, area, access time, drive capability, quiescent average and peak power dissipations, maximum number of ports, mode of communication (sequential or concurrent), packet length, average net delay, etc. Table 1 provides list of symbol definitions for specifying various parameters.

TABLE 1

LIST OF SYMBOLS

| SYMBOL | DEFINITION |
|---|---|
| $t_i$ | Task i |
| $e_j$ | Task graph edge j |
| $\pi_{im}$ | Execution time of task i on PE m |
| $\rho_{im}$ | Preferential mapping of task i on PE m |
| $\chi_{ih}$ | Exclusion indicator between tasks i and h |
| $\zeta$ | Preemption overhead |
| $\Psi_{jl}$ | Time to communicate the data on edge $e_j$ on communication link l |
| $\tau^d$ | Fault-detection latency |
| $\Phi_k$ | Fault-detection time at task $t_k$ |

Each task is characterized by an execution vector that indicates the execution time of a task on PEs in the PE library and by a preference vector that indicates the preferential mapping of a task on various PEs (such PEs may have a special resource for the task). In addition, each task is characterized by an exclusion vector that indicates which pairs of tasks (if any) cannot co-exist on the same PE (such pairs may create processing bottlenecks).

Each edge is characterized by the number of information bytes to be transferred and by a communication vector that indicates the communication time for the edge on various links from the library. The communication vector is calculated a priori. At the beginning of co-synthesis, since the actual number of ports in the link is not known, an average number of the ports (specified beforehand) is used to determine the communication vector. This vector is recomputed after each allocation considering the actual number of ports and accurate net delay information provided after floor planning of the functional blocks in the architecture. SYNSOC supports both sequential and concurrent modes of communication, where communication and computation cannot and can (if supported by the associated communication link and PEs) go on simultaneously, respectively. A static scheduler employs a combination of preemptive and non-preemptive scheduling to derive the efficient schedules. Tasks and edges are scheduled based on deadline-based priority levels (defined in the next section). The static scheduler schedules all copies of tasks and edges in a hyperperiod (defined as a least-common multiple of periods of all task graphs) (see References (5) and (21)) to guarantee scheduling for real-time systems. An incremental performance estimation approach (see Reference (18)) is used to evaluate architectures during co-synthesis. Initial execution and communication vectors are determined a priori using either experimental measurements, simulation, or performance estimation tools. See References (18)–(20).

Execution and communication vectors for the task graph of FIG. 2(a) are given in FIG. 2(c).

For dependability analysis, the failure-in-time (FIT) rate of a component or system, and mean-time-to repair (MTTR) are assumed to be specified. The FIT rate indicates the expected number failures in $10^9$ hours of operation.

Traditionally, for fault-detection purposes, either an assertion task is added to check the output of each task, or the task is duplicated and a comparison task checks the duplicate outputs. An assertion task checks some inherent property of the output data from the original task. See References (12), (15), (16) and (17). If that property is not satisfied, it flags the output data as erroneous. Some common examples of assertion tasks used in telecom transport systems are (a) parity error detection, (b) address range check, (c) bipolar-coding error detection, (d) checksum error detection, (e) loss-of-synchronization detection, and (f) software input and output data constraints check. For each task, it is specified whether an assertion task(s) for it is available or not. For each assertion, an associated fault coverage is specified A combination of assertions may sometimes be required to achieve the desired fault coverage. For each such task, a group of assertions and the location of each assertion is specified. For each check (assertion or compare) task, the execution vector and the communication vector of the edge between the checked and check tasks are specified.

SYNSOC also exploits architectural hints such as preferential allocation, layout hint, etc., provided by architects based on prior experience or the nature of the system or task graphs.

The SYNSOC Algorithm

This section first provides an overview of the SYNSOC system and then follows up with detail of each step. FIG. 3 presents the co-synthesis process flow of SYNSOC, according to one embodiment a the present invention. SYNSOC comprises two basic phases: a pre-processing phase (302), followed by synthesis phase (304).

During the pre-processing phase, SYNSOC processes the task graphs, system constraints, and resource library, and creates necessary data structures. In particular, the task graphs, system/task constraints, and resource library are first parsed (306) and appropriate data structures are then created (308). As mentioned before, in traditional real-time computing theory, if period, is the period of task graph i then (hyperperiod÷period$_i$) copies are obtained for it. See References (5) and (21). However, explicitly dealing with these many copies is impractical from both a co-synthesis CPU time and a memory requirements point of view, especially for-multi-rate task graphs for which this ratio may be very large. SYNSOC uses the concept of an association array (See Reference (11)) to tackle this problem an efficiently manage the information about various copies of each task and edge in the hyperperiod.

Tasks are ordered based on their priority, with the mapping of tasks (edges) to PEs (links) being determined during the synthesis phase. SYNSOC has two loops in the co-synthesis process flow: (1) an outer loop (310) for selecting tasks and (2) an inner loop (312) for evaluating various allocations for each task. For each task, an allocation array consisting of all possible allocations is created (314). For each allocation (316), floor-planning of various functional blocks is performed (318) to accurately estimate the delay of each net. See References (22)–(25), which discuss floor-planning for integrated circuits, but not in the context of a co-synthesis system. According to the present invention, delay estimates are used to refine the communication vectors for each edge. Accurate delay information is used during scheduling (320). Incorporating scheduling as well as layout-based delay estimation into the inner loop facilitates accurate performance evaluation. An important part of performance evaluation is finish-time estimation. This estimation process uses the start and finish times of each task and estimates whether the tasks with specified deadlines meet those deadlines or not.

The allocation evaluation step (324) compares the current allocation against previous ones based on an assessment of the cost of the architecture (322). If there are multiple allocations with equal dollar costs, SYNSOC picks the allocation with the lowest average power consumption (assuming power optimization is a secondary objective).

In a preferred embodiment, when the allocation array is created for the current task (314), the different possible allocations are ordered according to some appropriate priority level (e.g., cost or power consumption) from highest to lowest priority. As such, during the synthesis phase, the first allocation that enables the task to satisfy its processing deadlines is preferably selected as the best allocation for that task. In particular, if all of the deadlines are met (324), but not all of the tasks have been explored (326), then the current allocation is selected for the current task and processing returns to the outer loop to select the next task (314). If all of the deadlines have been met (324) and all of the tasks have been explored (326), then the synthesis phase is complete. However, if all of the deadlines are not met by the current allocation for the current task (324), but there are more allocations in the allocation array (328), then the processing of the inner loop returns to select the next allocation in the allocation array for the current task (316). If the deadlines have not been met (324) and all of the allocations in the allocation array have been tested (328), then the best allocation for the current task is selected and SYNSOC continues to step (330). In particular, if there are more tasks (330), then the outer-loop processing return to select the next task (314). Otherwise, all of the tasks have been tested and processing of the unsuccessful synthesis phase terminates with the production of the best possible solution, which may not meet all of the deadlines.

The Association Array (308)

An association array is used to efficiently manage the information about all copies of each task and edge in the hyperperiod. An association array has an entry for each task of each copy of the task graph and contains information such as: (1) the PE to which it is allocated, (2) its priority level, (3) its deadline, (4) its best-case finish time, and (5) its worst-case finish time. The deadline of the n$^{th}$ instance of a task graph is offset by (n−1) multiplied by its period from the deadline in the original task graph. The association array not only eliminates the need to replicate task graphs, it also allows allocation of different task graph instances to different PEs of the same type, if desirable, to derive an efficient architecture. This array is preferably updated after each performance of scheduling.

If a task graph has a deadline less than or equal to its period, there can be only one instance of the task graph in execution at any instant. Such a task graph needs only one dimension in the association array, called the horizontal dimension. If a task graph has a period less than its deadline, there can be more than one instance of this task graph in execution at some instant. For such tasks, the vertical dimension is added, which corresponds to concurrent execution of the different instances.

Task Allocation (314)

Tasks are ordered based on decreasing priority levels. Deadline-based priority levels are first assigned to tasks and edges using the following procedure. A non-sink task $t_h$ may either have a deadline or not. $\omega(t_h)$ is defined to be equal to the deadline of $t_h$ if the deadline is specified, and $\infty$ otherwise.

(a) Priority level of sink task $t_i = \pi^{max}(t_i) - \text{deadline}(t_i)$ (b) Priority level of an edge $e_j$=priority level of destination node $(e_j) + \Psi^{max}(e_j)$ (c) Priority level of non-sink task $t_h$=max (priority level of its fanout edge $e_f$, $-\omega(t_h)) + \pi^{max}(t_h)$ As an example, the numbers adjacent to nodes and edges in FIG. 2(d) indicate their initial priori, levels. A dynamic priority level is used. That is, after the allocation of each task, the priority level of each task is recalculated to take into consideration the accurate execution and communication time information available after each allocation. The task with the highest priority level is picked and an allocation array of all possible allocations for the given task in the outer loop of co-synthesis is created. The inner loop of co-synthesis is used to evaluate the allocations from this array.

Outer Loop (310)

The allocation array considers the following: (1) architectural hints, (2) preference vector, (3) allocation of the tasks to existing resources in the partial architecture, (4) upgrade of links, (5) upgrade a PEs, (6) addition of PEs, and (7) addition of links. System clock determination is very important for optimizing the system performance. The approach from Reference (26), the teachings of which are incorporated herein by reference, is used to determine the system clock frequency. There can be one or more system clocks. For example, a processor core can operate at one clock frequency while some peripheral functional blocks operate at another frequency. System clock determination is performed by creating various possible allocations depending on the available clock frequency for each PE. During allocation array creation, addition of up to two new PEs and links of the same type is allowed to reduce the size of the allocation array. However, the SYNSOC algorithm preferably allows the user to specify this number as well.

Inner Loop (312)

All allocations are first marked as unvisited. The allocations in the allocation array are preferably ordered in the order of increasing dollar cost. See Reference (18). After the unvisited allocation with the lowest dollar cost is picked and marked as visited, the floor-planning & delay estimation, scheduling, and solution evaluation steps are implemented. Usually only the first copy of the task needs to be scheduled. The start and finish times of the remaining copies are updated in the association array. See Reference (11). However, in some cases, scheduling of some of the other copies may be necessary. This is followed by the performance estimation step. If system real-time constraints are not met, a more expensive architecture will be obtained by exploring other allocations from the allocation array.

For low-power systems, allocations in the allocation array are ordered on the order of decreasing average power dissipation instead of dollar cost.

Floor-Planning and Delay Estimation (318)

FIG. 4 shows pseudocode for the floor-planning and delay estimation procedure of FIG. 3, which is implemented for the currently selected allocation (316). Once the allocation is selected for evaluation the floor plan of the chip is defined and the delay estimate is updated for each net using the procedure given in FIG. 4. In order to estimate the delay, the placement of the functional blocks is first defined. Based on the placement of the functional blocks, the delay estimate is updated for each net.

In particular, all PEs and links are first marked unselected (Line 3 in FIG. 4) and the floor plan is initialized (Line 4). For each PE, the connectivity index is defined as the number of incoming and outgoing nets (Line 5). An array PE_array of PEs is formed, where PEs are ordered on the order of decreasing connectivity index (Line 7). SYNSOC attempts to use layout hints to place the PEs (Lines 8–11). Each layout hint indicates the layout for an associated group of PEs and links. If hints are not specified for all PEs, SYNSOC selects each unselected PE from the PE_array (Lines 13–14) and places it next to the maximally compatible PE in the partial floor plan (Line 15). The maximally compatible PE is defined as the one from the group of selected PEs with which it has the maximum number of inter-connections (nets). Once all PEs are placed, the length of each net is computed, the delay estimates are updated (e.g., assuming that the delay is directly proportional to the length of the net based on a known time/length rating for that type of net), and the corresponding tasks graphs are modified based on the updated delay estimates (Lines 18–21).

Scheduling

The SYNSOC scheduler schedules both the tasks allocated to general-purpose processors as well as the communication on links. SYNSOC orders tasks and edges based on a decreasing order of their priority levels. If two tasks (edges) have equal priority levels, then SYNSOC schedules the task (edge) with the shorter execution (communication) time first. SYNSOC supports both pre-emptive and non-preemptive scheduling. The preemption overhead $\zeta$ is specified a priori for each general-purpose processor. It includes context switching and any other processor-specific overheads. Preemption of a higher priority task by a lower priority task is allowed only in the case when the higher priority task is a sink task that will not miss its deadline, in order to minimize the scheduling complexity. This is important since scheduling is in the inner loop.

Performance Estimation

SYNSOC employs the incremental performance estimation approach from Reference (18) to efficiently evaluate architecture alternatives. The cost of the architecture is determined based on the cost profile of the technology and packages used for systems-on-chips. SYNSOC takes into consideration the forecasted yearly volume for SOCs provided a priori to estimate the cost of the architecture and make architectural trade-offs. SYNSOC estimates the finish times of all tasks with specified deadlines and checks whether their deadlines are met.

Allocation Evaluation

SYNSOC picks the allocation that at least meets the deadline in the best case. If no such allocation exists, SYNSOC picks an allocation for which the summation of the best-case finish times of all tasks with specified deadlines in all task graphs is maximum. To break ties, SYNSOC picks an allocation for which the summation of the worst-case finish times of all tasks with specified deadlines is minimum. This approach generally leads to the least expensive architecture. If there is more than one allocation meeting this criterion, SYNSOC chooses the allocation for which the average power dissipation is minimum.

System Power Dissipation

The average power dissipation of the partial architecture is estimated by dividing the total estimated energy dissipated in PEs/links in it by the hyperperiod. To estimate the power dissipation for each PE (link), SYNSOC identifies the number of instances of each associated task (edge) in the hyperperiod and multiplies with the corresponding execution (communication) time to get the active average energy. In addition, SYNSOC identifies quiescent energy for each PE (link). In order to estimate the quiescent energy for each PE (link), SYNSOC identifies the quiet time (when no task (edge) is active) multiplied by the quiescent power dissipation. Total energy for each PE (link) is defined as the summation of active average energy and quiescent energy.

SYNSOC-FT

Fault-tolerant (FT) distributed embedded systems can offer high performance as well as dependability (reliability and availability) to meet the needs of critical real-time applications. For best results, hardware-software co-synthesis of such systems must incorporate fault tolerance during the synthesis process itself. SYNSOC-FT uses the concepts from References (12) and (15)–(17) to impart fault tolerance to the distributed embedded system architecture. The link-level faults are addressed by traditional techniques, such as data encoding, loss-of-signal detection, loss-of-clock detection, etc. Fault tolerance is accomplished through the addition of assertion tasks (see References (12) and (15)–(17) and duplicate-and-compare tasks to the system for fault detection, followed by error recovery. An assertion task checks some inherent property/characteristic of the output data from the original task. If that property is not satisfied, it flags the output data as erroneous. Some common examples of assertion tasks used in telecom transport systems are (a) parity error detection, (b) address range check, (c) protection switch-control error detection, (d) bipolar coding error detection, and (e) checksum error detection.

For each task, it is specified whether an assertion task is available or not. If not, the task is duplicated and the outputs of the two versions compared. For each assertion, an associated fault coverage is specified. It is possible that a single assertion is not sufficient to achieve the required fault coverage, and a combination of assertions is required. For each such task, a group of assertions and the location of each assertion is specified. For each check task (assertion or compare task), the weight of the communication edge between the checked task and check task and the execution vector of the check task is specified. SYNSOC-FT makes sure that a checked task and its check task are allocated to different PEs using the exclusion vector concept so that a single PE fault does not affect both. Similarly, a task and its duplicate, if one exists, are also allocated to different PEs.

If a task is capable of transmitting any error at its inputs to its outputs, it is said to be error-transparent. Many tasks in real-life task graphs have this property. For example, a task graph for telecom input interface processing consists of the following tasks in a chain: preamplification, timing recovery, bipolar coding, framing, and payload processing. All these tasks are error-transparent, and one assertion task at the output of the chain suffices for fault-detection purposes, if the fault-detection latency (the time it takes to detect the fault) constraint is satisfied. The protection switch time includes the fault-detection latency of the system and the error recovery time.

In critical embedded system applications, the dependability of the system is of utmost concern. The measures of dependability are reliability and availability. In general, systems in operation allow repair scenarios for failed components. For example, most of the telecom embedded systems are designed for critical applications requiring continuous operation where the repair scenario is allowed. Availability is a measure of the fraction of the time the system is available to perform the required functions and it is generally specified in terms of maximum allowed unavailability (1—availability) of the system in units of minutes per year. Also, different functions of embedded systems can have different unavailability constraints. Therefore, the unavailability constraints should be specified for each task graph in the specification. Error recovery is enabled through a few spare PEs. In the event of failure of any service module (a set of PEs grouped together for replacement purposes), a switch to a standby module is made for efficient error recovery. SYNSOC provides an option to the user to specify whether to put the standby functional blocks or PEs within the same chip or a seperate standby chip. The basic co-synthesis process of SYNSOC is also used in its extension for fault tolerance, termed SYNSOC-FT. The following sections describe how various steps are modified for fault tolerance.

Preprocessing

During preprocessing, an assertion or duplicate-and-compare task is added for each task to facilitate the fault detection.

In real-time systems, the fault-detection latency (the time it takes to detect a fault) can significantly impact the protection switch time which includes the fault-detection latency of the system and the error recovery time. Therefore, even when a task is error-transparent, it may be necessary to add a check task to its input to improve the fault-detection latency. See Reference (12). This is done as follows. Suppose the maximum allowable system fault-detection latency is $\tau^d$. SYNSOC-FT first computes the fault-detection latency for each check task, as illustrated by the following example.

Consider the task graph in FIG. 5(a). Its augmented task graphs with the addition of an assertion task and duplicate-and-compare tasks for task $t_j$ are shown in FIGS. 5(b) and 5(c), respectively. Suppose $t_j$ is error-transparent and $t_i$ and $t_k$ are not. The fault-detection latency $\tau^{jc}$ for check task $t_{jc}$ is equal to $\pi^w(t_j)+\Psi^{pw}(t_j,t_{jc})+\pi^w(t_{jc})$. The assertion or duplicate-and-compare tasks of $t_i$ can be eliminated only if: (1) in addition to being error-transparent, task $t_j$ also has an assertion task, and (2) $\pi^w(t_i)+\Psi^{pw}(t_i,t_j)+\tau^{jc} \leq \tau^d$. If $t_j$ does not have an assertion and needs duplicate-and-compare, then $t_i$ can feed the same erroneous input patterns to both $t_j$ and $t_{jd}$, which will in turn result in the same erroneous values at the outputs of $t_j$ and $t_{jd}$, and the error will not be detected. In this case, $t_i$'s output will need to be checked directly even though $t_j$ is error-transparent.

Let $\tau^{kc}$ be the fault-detection latency of task $t_{kc}$ where $t_k$ has a set M of input paths. Let $t_j$ be a task and $e_l$ be an edge on the $j^{th}$ path. The fault-detection time $\Phi_k$ at task $t_k$ is estimated using the following equation:

$$\Phi_k = \max_M\left(\sum_p \pi^w(t_j) + \sum_p \Psi^w(e_l)\right) + \tau^{kc}$$

p $\in$M,j$\neq$k,$e_l\in$p, and $t_j\in$p from last checked task.

SYNSOC-FT sums up the execution and communication times on each path after the last checked task on that path.

Inner Loop of Co-Synthesis

For each allocation, in addition to finish-time estimation, SYNSOC-FT explores whether any assertions need to be added, removed, or shared following scheduling. The error-recovery topology is automatically identified during co-synthesis. The group of service and protection modules together form a failure group (FG). In order to derive an efficient error-recovery topology, SYNSOC-FT identifies FGs and interconnections such that the unavailability constraints of various task graphs are satisfied. SYNSOC-FT uses the architecture graph-partitioning algorithm from Reference (12) to obtain the FGs. This graph-partitioning algorithm solves a restricted form of the graph isomorphism problem (see Reference (27)), and exploits the architectural hints, when available. Markov models (see Reference (28)) are used to evaluate the availability of each FG and the distributed architecture.

Experimental Results

SYNSOC was implemented in C++. It was run on various real-life system task graphs such as those for a cellular handset, a video set top box, a frame relay interface, an ATM switch controller, and a video coder/decoder. These are large task graphs representing real-life field applications. These task graphs have wide variations in their periods ranging from 25 microseconds to 2 minutes. The real-time constraints varied from 100 microseconds to 5 minutes. The execution times for the tasks in these graphs were either experimentally measured or estimated based on existing designs. The general-purpose processors cores in the resource library had the real-time operating system CHORUS (see Reference (29)) running on them. The execution times included the operating system overhead. For results on these graphs, the PE library was assumed to contain Motorola microprocessors cores for ColdFire and PowerPC processors running at 25 MHz, 33 MHz, 50 MHz, and 66 MHz, RAM, ROM, 8 custom, 2 programmable logic blocks, 16 non-custom functional blocks, and voltage translation buffers. The link library contained functional blocks for 155 Mb/s link, 10 Mb/s LAN, and processor busses operating at the various processor frequencies mentioned above. For performance estimation, the model library and netlist provided by the manufacturer were used. The failure-in-time (FIT) rates for the various modules were either based on existing designs or estimated using Bellcore guidelines. See Reference (30). Mean time to repair (MTTR) was assumed to be four hours. The unavailability constraints for task graphs providing provisioning and transmission functions were assumed to be 30 minutes/year and 12 minutes/year, respectively. The SYNSOC co-synthesis system defines the error-recovery topology for the embedded system-on-a-chip using redundant functional blocks to ensure that unavailability constraints are met. The cost of the final architecture was estimated using the cost curve provided for die size and yearly volume, where a yearly volume of 25K for each system was assumed for dollar cost computation. CPU times for co-synthesis were measured on an Ultra Sparcstation 30 with 256 MB RAM FIG. 6 presents Table 2, which shows the experimental results. CDHST and VDSTP represent cellular handset and video set-top box application task graphs, respectively. FRLYIN and ACSINF represent frame relay interface and ATM switch controller applications, respectively. The first major column shows results using architectures without a systems-on-a-chip concept, i.e., using discrete devices. The second major column shows results using SYNSOC without exploiting power optimization SYNSOC can achieve up to 90% cost reduction over non-SOC architectures. Note that the cost of the power converters and printed wiring boards are not included in the cost data. Difference in architecture cost using the same size device package results from different die size and difference in functional blocks. The third major column indicates results with SYNSOC employing power optimization. This low-power extension of SYNSOC is seen to achieve up to 17% power reduction. The fourth major column shows results with SYNSOC-FT. In the case of fault-tolerant architectures, SYNSOC-FT employed redundant functional blocks on the same chip assuming that the fault will be limited to one functional block at a time, which is a standard assumption made in portable fault-tolerant computing devices. However, this may not be true for other applications. In that case, the redundant functional blocks can be put on a standby chip. SYNSOC-FT is able impart fault tolerance with up to 32% reduction in overhead compared to double-modular-redundant (DMR) architectures. In order to derive the cost of a DMR architecture, the cost of the simplex architecture from the second major column was doubled. The error of the SYNSOC delay estimator was found to be less than 12% when estimated delays were compared with actual measurements from synthesized chips.

CONCLUSIONS

The present invention provides an efficient co-synthesis algorithm for hardware-software co-synthesis of systems-on-a-chip for low-power as well as fault-tolerant applications. Experimental results on various real-life examples are very encouraging. To the best of our knowledge, this is the first hardware-software co-synthesis for systems-on-a-chip which optimizes power and fault tolerance overhead.

REFERENCES

The following references are incorporated herein by reference:

(1) H. Meyer, "On core and more: a design perspective for system-on-chip," in Proc. 1997 IEE Workshop on Signal Processing Systems, SIPS 97, pp. 60–63, November 1997.

(2) E. McShane et. al, "One-chip wonders," Circuits & Devices, pp. 35–42, September 1998.

(3) S. Iwata, et al, "Performance evaluation of a microprocessor with on-chip DRAM and high bandwidth internal bus," in Proc. of Custom Integrated Circuits Conference (CICC), pp. 269–22, 1996.

(4) M. R. Garey and D. S. Johnson, Computers and Intractability: A Guide to the Theory of NP-Completeness, W. H. Freeman and Co., 1979.

(5) D. Kirovski and M. Potkonjak, "System-level synthesis of low-power real-time systems," it Proc. Design Automation Conf., pp. 697–702, June 1997.

(6) J.-M. Berge, O. Levia, and J. Rouillard (Editors), Hardware/software do-design and co-verification, Kluwer Academic Publishers, Dordrecht, Netherlands, 1997.

(7) J. Staunstrup and W. Wolf (Editors), Hardware/software co-design—principles and practice Kluwer Academic Publishers, Dordrecht, Netherlands, 1997.

(8) S. Prakash and A. Parker, "SOS: Synthesis of application-specific heterogeneous multiprocessor systems," J. Parallel & Distributed Comput., pp. 338–351, December 1992.

(9) J. G. D'Ambrosio and X. Hu, "Configuration-level hardware/software partitioning for real-time systems," in Proc. Int. Wkshp. Hardware-Software Co-Design, 1994.

(10) T.-Y. Yen and W. Wolf, "Communication synthesis for distributed embedded systems," in Proc. Int. Conf. Computer-Aided Design, November 1995.

(11) B. P. Dave, G. Lakshminarayana, and N. K. Jha, "COSYN: Hardware-software co-synthesis of embedded systems," in Proc. 34th Design Automation Conference, pp. 703–708, June 1997

(12) B. P. Dave and N. K. Jha, "COFTA: Hardware-software co-synthesis of heterogeneous distributed embedded system architectures for low overhead fault tolerance," in Proc. Int. Symp. Fault-Tolerant Computing, pp. 339–348, June 1997.

(13) M. B. Srivastava and R. W. Brodersen,. "SIERA: A unified framework for rapid prototyping of system-level hardware and software," IEEE Trans. Computer-Aided Design, vol. 14, pp 676–693, June 1995.

(14) J. Henkel and R. Ernst, "A hardware/software partitioner using a dynamically determined granularity," in Proc. Design Automation Conf., pp. 691–696, June 1997.

(15) F. Distante and V. Piuri, "Hill-climbing heuristics for optimal hardware dimensioning and software allocation in fault-tolerant distributed systems," IEEE Trans. Reliability, pp. 28–39, April 1989.

(16) S.M. Shatz, J.-P. Wang, and M. Goto, "Task allocation for maximizing reliability of distributed computer systems," IEEE Trans. Comput., vol. 41, pp. 1156–1168, September 1992.

(17) F. Wang, K. Ramamritham and J.A. Stankovic, "Determining redundancy levels for fault tolerant real-time systems," IEEE Trans. Comput., pp. 292–301, February 1995.

(18) F. Vahid and D. Gajski, "Incremental hardware estimation during hardware/software functional partitioning," IEEE Trans. VLSI Systems, vol. 3, no.3, pp. 459–464, September 1995.

(19) Y.-T. S. Li, S. Malik and A. Wolfe, "CINDERELLA: A retragetable environment for performance analysis of real-time software," in Proc. Euro-par, 1997.

(20) I. E. Bennour, M. Langevin, E. M. Aboulhamid, "Performance analysis for hardware/software co-synthesis, " in Proc. Canadian Conf. on Elec. and Comput. Eng., pp. 162–165, May 1996.

(21) E. Lawler and C. Martel, "Scheduling periodically occurring tasks on multiple processors," Inf. Proc. Letters, vol. 12, February 1981.

(22) J. R. Long and M. A. Copeland, "Modeling, characterization, and design of monolithic inductors for silicon RFICs," in Proc. of Custom Integrated Circuits Conference, pp. 185–18, 1996.

(23) L. Stockmeyer, "Optimal orientations of cells in slicing floorplan designs," Information and Control, pp. 91–101, June 1983.

(24) C. M. Fiduccia and R. M. Mattheyses, "A linear-time heuristic for improving network partitions," in Proc. Design Automation Conf., pp. 173–181, June 1982.

(25) J. Cong et. al, "Interconnect design for deep submicron ICs," in Proc. ICCAD, pp. 478–485, November 1997.

(26) S. Shehata, B. Haroun, and A. J. Al-Khalili, "Performance optimization and system clock determination for synthesis of DSP cores targeting FPGAs," in Proc. IEEE Int. ASIC Con and Exhibit, pp. 151–154, September 1996.

(27) C.M. Hoffman, Group-Theoretic Algorithms and Graph Isomorphism, Springer-Verlag, 1982.

(28) J.D. Musa, A. Iannino, K. Okumoto, Software Reliability: Measurement, Prediction, Application, McGraw-Hill, 1990.

(29) F. Pruser, "CHORUS/JaZZ rt technical overview," Chorus Systems Tech. Rep., May 1997.

(30) Bellcore, "Generic reliability assurance requirements for fiber optic transport systems," Tech. Ref. TR-NTW-00418, December 1992.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for designing an architecture of an embedded system-on-a-chip (SOC), comprising:
   (a) a pre-processing phase comprising the step of parsing one or more task graphs, one or more system/task constraints, and a resource library for the embedded SOC; and
   (b) a synthesis phase, following the pre-processing phase, comprising the step of allocating one or more groups of one or more tasks in the task graphs to one or more processing elements (PEs) in the resource library and allocating one or more edges in the task graphs to one or more communication links in the resource library, based on performance evaluation of one or more possible allocations for each of the groups and edges in light of the system/task constraints, to generate a current version of the embedded SOC, wherein, prior to the performance evaluation for a current allocation, floor-planning is performed to update a delay estimate for each of one or more of the allocated edges in the current version of the embedded SOC, wherein, during the floor-planning, PEs are placed into a floor plan in order of decreasing connectivity index, wherein the connectivity index for a PE represents a number of communication links to and from the PE.

2. The invention of claim 1, wherein:
   the pre-processing phase further comprises the step of assigning one or more fault-detection tasks to one or more original tasks in the tasks graphs; and
   the synthesis phase takes into account the fault-detection tasks in order to generate a fault-tolerant embedded SOC that can perform fault detection for the one or more original tasks.

3. The invention of claim 1, wherein power dissipation of each allocated edge is taken into account during the performance evaluation.

4. The invention of claim 3, wherein the power dissipation of each allocated edge is estimated taking into account an active average energy of the corresponding communication link during active periods of the allocated edge and a quiescent energy of the corresponding communication link during quiescent periods of the allocated edge.

5. The invention of claim 1, wherein the delay estimate for an allocated edge is based on a length of the corresponding communication link in the embedded SOC.

6. The invention of claim 1, wherein the performance evaluation includes a determination of whether one or more processing deadlines of one or more tasks graphs are satisfied.

7. The invention of claim 1, wherein the floor-planning comprises the step if utilizing one or more layout hints, each layout hint corresponding to a partial floor plan for a group of two or more PEs and one or more corresponding communication links.

8. The invention of claim 1, wherein, during the floor-planning, a currently selected PE is placed into a floor plan next to a previously placed PE having a maximum number of communication links to and from the currently selected PE.

9. The invention of claim 1, wherein the one or more updated delay estimates are used to modify timing of one or more corresponding task graphs prior to the performance evaluation for the current allocation.

10. The invention of claim 9, wherein the performance evaluation includes a determination of whether one or more processing deadlines of one or more of the modified tasks graphs are satisfied.

11. The invention of claim 1, wherein:
   the pre-processing phase further comprises the step of assigning one or more fault-detection tasks to one or more original tasks in the tasks graphs;
   the synthesis phase takes into account the fault-detection tasks in order to generate a fault-tolerant embedded SOC that can perform fault detection for the one or more original tasks;
   power dissipation of each allocated edge is taken into account during the performance evaluation, wherein the power dissipation of each allocated edge is estimated taking into account an active average energy of the corresponding communication link during active periods of the allocated edge and a quiescent energy of the corresponding communication link during quiescent periods of the allocated edge;

the delay estimate for an allocated edge is based on a length of the corresponding communication link in the embedded SOC;

the performance evaluation includes a determination of whether one or more processing deadlines of one or more tasks graphs are satisfied;

the floor-planning comprises the step of utilizing one or more layout hints, each layout hint corresponding to a partial floor plan for a group of two or more PEs and one or more corresponding communication links;

during the floor-planning, a currently selected PE is placed into a floor plan next to a previously placed PE having a maximum number of communication links to and from the currently selected PE; and the one or more updated delay estimates are used to modify timing of one or more corresponding task graphs prior to the performance evaluation for the current allocation, wherein the performance evaluation includes a determination of whether one or more processing deadlines of one or more of the modified tasks graphs are satisfied.

12. A computer-implemented method for designing an architecture of an embedded system-on-a-chip (SOC), comprising:

(a) a pre-processing phase comprising the step of parsing one or more task graphs, one or more system/task constraints, and a resource library for the embedded SOC; and (b) a synthesis phase, following the pre-processing phase, comprising the step of allocating one or more groups of one or more tasks in the task graphs to one or more processing elements (PEs) in the resource library and allocating one or more edges in the task graphs to one or more communication links in the resource library, based on performance evaluation of one or more possible allocations for each of the groups and edges in light of the system/task constraints, to generate a current version of the embedded SOC, wherein:

prior to the performance evaluation for a current allocation, floor-planning is performed to update a delay estimate for each of one or more of the allocated edges in the current version of the embedded SOC; and during the floor-planning, a currently selected PE is placed into a floor plan next to a previously placed PE having a maximum number of communication links to and from the currently selected PE.

13. A computer-implemented method for designing an architecture of an embedded system-on-a-chip (SOC), comprising:

(a) a pre-processing phase comprising the step of parsing one or more task graphs, one or more system/task constraints, and a resource library for the embedded SOC; and (b) a synthesis phase, following the pre-processing phase, comprising the step of allocating one or more groups of one or more tasks in the task graphs to one or more processing elements (PEs) in the resource library and allocating one or more edges in the task graphs to one or more communication links in the resource library, based on performance evaluation of one or more possible allocations for each of the groups and edges in light of the system/task constraints, to generate a current version of the embedded SOC, wherein:

prior to the performance evaluation for a current allocation, floor-planning is performed to update a delay estimate for each of one or more of the allocated edges in the current version of the embedded SOC; and the one or more updated delay estimates are used to modify timing of one or more corresponding task graphs prior to the performance evaluation for the current allocation.

14. The invention of claim 13, wherein the performance evaluation includes a determination of whether one or more processing deadlines of one or more of the modified tasks graphs are satisfied.

* * * * *